United States Patent
Blass et al.

(10) Patent No.: US 6,296,489 B1
(45) Date of Patent: Oct. 2, 2001

(54) SYSTEM FOR SOUND FILE RECORDING, ANALYSIS, AND ARCHIVING VIA THE INTERNET FOR LANGUAGE TRAINING AND OTHER APPLICATIONS

(75) Inventors: Laurie J. Blass, Corte Madera; Pamela H. Elder, Orinda, both of CA (US)

(73) Assignee: Heuristix, Corte Madora, CA (US)

( * ) Notice: Subject to any disclaimer, the term of this patent is extended or adjusted under 35 U.S.C. 154(b) by 0 days.

(21) Appl. No.: 09/339,462

(22) Filed: Jun. 23, 1999

(51) Int. Cl.$^7$ ............................ G09B 19/04; G09B 19/06
(52) U.S. Cl. ...................... 434/185; 709/203; 434/307 R
(58) Field of Search .................................. 434/350, 185, 434/307 R, 321

(56) References Cited

U.S. PATENT DOCUMENTS

| | | | |
|---|---|---|---|
| 4,615,680 | * 10/1986 | Tomatis ................................. | 434/157 |
| 5,002,491 | * 3/1991 | Abrahamson et al. .............. | 434/322 |
| 5,267,865 | * 12/1993 | Lee et al. ............................. | 434/350 |
| 5,441,415 | * 8/1995 | Lee et al. ............................. | 434/350 |
| 5,727,950 | * 3/1998 | Cook et al. .......................... | 434/350 |
| 5,748,841 | * 5/1998 | Morin et al. ......................... | 395/2.66 |
| 5,754,857 | * 5/1998 | Gadol ................................... | 395/680 |
| 6,017,219 | * 1/2000 | Adams, Jr. et al. ................. | 434/178 |
| 6,149,441 | * 11/2000 | Pellegrino et al. .................. | 434/350 |

OTHER PUBLICATIONS

"A Call tool for improving second language acquistion of the English consonants by Japanese learners", S. Lambacher, pp. 137–156, from Computer Assisted Language Learning, vol. 12, No. 2.*
Julia Komissarchik, BetterAccent Tutor, "Pronunciation training software", 3 pgs.
Key Elemetrics Corp., Visi–Pitch II for ESL, "An Innovative Approach to Accent Reduction", 2 pgs.
Language Connect Institute, "Accent Coach, English Pronunciation Trainer", Syracuse Language, 2 pgs.
Pronunciation Power, "The Power of Pronunciation", 2 pgs.
Accent Technologies, "Accent Lab analyzes pronunciaiton Learners correct themselves", 2 pgs.
Syracuse Language, "Smart Start, Japanese", User's Manual, 1998, 3 pgs.
The Learning company Properties, Inc., "Learn to Speak English", 3 pgs., 1998.
"Using GRAM 41" Demonstration of applied spectrogram use in the voice studio, 5 pgs., dovnloaded from www.users.drew.edu/, 1999.
RBN Technical Whitepaper, 10 pgs., downloaded from www.real.com/solutions, 1999.
"Spectrogram Reading", What are spetrograms, 4 pgs., downloaded from www.cslu.cse.ogi.edu/tutordemos, 1999.
"The Real Time Frequency Analyzer", 3 pgs., downloaded from www.relisoft.com, 1999.
Sensimetrics, "Speech Station 2", 8 pgs., downloaded from www.sensimetrics.com, 1999.
Javan, "Java Sound Engine Integration", tuturial, 5 pgs. downloaded from www.caad.arch.ethz.ch/., 1999.

* cited by examiner

*Primary Examiner*—Joe H. Cheng
*Assistant Examiner*—Kathleen M Christman
(74) *Attorney, Agent, or Firm*—Tran & Associates; Bao Tran

(57) ABSTRACT

The invention is a system for sound file recording, comparison, and archiving for network-based language and communications training, or other applications. The invention allows capture of multimedia data from a user, and allows the user to play back his or her self-created sound inputs and to view various comparisons of his or her sound inputs with model sounds. The invention displays a waveform or spectrogram of a model sound superimposed over a waveform (or spectrogram) of the user's sound input. It can display a failure/success indication for the user's sound input relative to a predetermined standard. Further, the invention allows a user to archive sound files for subsequent review and analysis.

18 Claims, 8 Drawing Sheets

SYSTEM FOR SOUND FILE RECORDING, ANALYSIS, AND ARCHIVING VIA THE INTERNET FOR LANGUAGE TRAINING AND OTHER APPLICATIONS

BACKGROUND

1. Field of the Invention

The present invention relates to systems and methods for recording, analyzing, and archiving sound files principally for distance learning applications (such as language learning, communication skills training, performance arts training), and speech-language assessment and/or therapy, or any other application over the World Wide Web, using Internet-connected computers.

2. Background of the Invention

In today's global environment, good communication skills are increasingly important. These skills are invaluable in business settings, both domestically and abroad. They are also essential for success in most careers, educational pursuits, and personal relationships. The ability to speak one's native language clearly and precisely and to accomplish specific communicative tasks (such as persuasion or conflict resolution in a context-specific manner), is a key to success. The ability to speak a foreign language with clarity and fluency is also necessary when working, living, or traveling in another country.

Teachers, trainers, and other instructional professionals usually conduct language learning, accent coaching, foreign/second language learning and native language communication skills training courses with groups of students who gather in classrooms or language laboratories at schools, colleges, and other educational institutions. They also teach onsite in corporate settings. Current methodologies may include one or more of the following support materials and technologies: blackboards, whiteboards, textbooks, graphics, tape players, VCRs, and audio- and videotapes.

Classroom learning is not practical for many people due to time and cost constraints. In addition, taking time away from work or other responsibilities to take language learning or communications skills development courses at an institution is difficult for many people. Therefore, many people purchase self-study programs that they can follow in their free time. These programs include audio- and videocassettes and CD-ROM formats.

The benefits of these self-study courses are that they are low-cost, people can do them at any time, and they can do them alone in the privacy of their own home. This last benefit is especially important in that many people feel less inhibited about acquiring and practicing communication skills when they are alone. In fact, the fear of making mistakes or seeming foolish or childlike in front of others inhibits many people from succeeding in foreign language and communication courses.

In addition to the demand for self-study programs, class size at many institutions limits the opportunities for students of foreign or second languages and communication skills to get adequate individual attention. Therefore, there is an increased need for a customizable, home- or lab-based learning environment that is available twenty-four hours a day to supplement in-class learning. To serve this need, web-based and CD-ROM based learning programs have been developed.

Existing web-based language learning programs address the need for individualized, low cost and convenient access. However, these programs do not offer on-line sound capture/archiving and spectrographic comparison capabilities which facilitate oral language and speech communication skill development.

Though some CD-ROM-based programs allow sound capture, playback, comparing, archiving, and meet the need for relative low cost and convenient access, they unfortunately preclude immediate student/teacher, student/trainer, and student/student interaction. Further, they cannot be modified easily by publishers or instructors in order to meet the changing needs of students.

Therefore, a readily accessible, instructor- or publisher-modifiable, World Wide Web-based system with a selection of tools for teaching and learning languages and communication skills can provide a better way for many students throughout the world to acquire these skills.

Drama coaches and music teachers also usually instruct students in a classroom, studio, or theater setting, occasionally using audio- or videotapes for modeling and feedback in practice sessions. Practice is a large, necessary part of learning dramatic roles and music and is usually done in isolation. Students must do it away from the class setting and often have difficulty finding the motivation to practice on their own. An easily accessible tool for practice can assist a student in mastering his or her art more rapidly.

Also, because instrumental music and voice instruction is most frequently conducted one-on-one, it can prove expensive and inconvenient for many students. Pre-programmed, computerized keyboard learning programs and CD-ROM-based guitar learning programs offer a convenient and inexpensive alternative and are popular choices for some. However, as with CD-ROM-based language programs, existing CD-ROM-based music training programs preclude immediate student/teacher, student/trainer, and student/student interaction. Further, they cannot be modified easily by publishers or instructors in order to meet the changing needs of students.

In another application involving speech-language disorder evaluation, analysis, and therapy, children and adults with speech-language disorders are diagnosed and treated in clinic, lab, and classroom settings. Speech-language disorders may include aphasia, neurogenic communication disorders, autism spectrum disorders, and hyperfunctional voice disorders. Speech-language pathologists use specialized audio equipment and computer programs to analyze speech disorders and to provide clients with therapeutic verbal activities. Sound spectrographs are used for analysis and feedback. Using the system functions, clients can develop needed auditory discrimination, speech pattern recognition, and relaxation techniques.

Because it is difficult for many stroke- or other neurologically disabled patients and children with speech-language disorders to be transported to access the professional help they need, the present invention allows easy and frequent access to treatment. Speech-language pathologists and speech therapists can obtain on a regular basis over time, and at their clients' convenience, verbal sound samples from which diagnosis and treatment can be determined. They can then distribute via the Internet therapeutic activities that employ self-feedback, or feedback that can be monitored off-site by a care giver. This allows clients to obtain the therapy they need in the convenience of their home, nursing care or assisted-living facility setting, and at lower cost. Though many speech-language pathologists and therapists will no doubt need to continue seeing patients in the traditional professional setting as well, they can readily supplement in-office (or clinic or lab) diagnosis and therapy with at-home activities and treatment.

SUMMARY

The invention provides an apparatus and a method for training users over a network. The training method includes capturing multimedia data from a user; providing feedback to the user by allowing the user to play, compare and capture multimedia data; and archiving the captured multimedia data over a network.

Implementations of the invention include one or more of the following. An applet-type program can be downloaded for capturing the multimedia data from a user and one or more multimedia source files. The captured multimedia data can be compared against one or more multimedia source files. Waveforms associated with the captured multimedia data can be shown to the user for review. Spectrograms associated with the captured multimedia data can also be displayed to the user for review. The spectrogram associated with the captured multimedia data can be shown superimposed over a spectrogram associated with the one or more multimedia source files for comparison. The multimedia data can be speech, audio, or video data. The applet-type program can be a Java Sound applet. The captured multimedia data can be stored in a memory structure. The captured multimedia data can also be uploaded to a remote server for archival.

Advantages of the invention include one or more of the following. The present invention provides a suite of online learning tools which can be used individually or in combination to facilitate the acquisition and analysis of communication skills via computer network technology. It can be used for any of the following didactic and/or diagnostic purposes: training in areas such as the spoken aspects of a second or foreign language; training in targeted business communication skills such as pronunciation, voice tone, and pitch, speaking pace, formality level, vocabulary development, and other communicative strategies such as persuasion; for teaching voice and instrumental instruction and for drama coaching; or for speech-language pathology diagnosis and therapy; or for any other sound-augmented training or instruction. It can also be used for other Internet-based sound capture and communications purposes.

The invention addresses at least five problems faced by language students and communication skills trainees in a classroom or language laboratory settings:

the expense the inconvenience inhibition on the part of the student the lack of individualization publishers' inability to modify fixed media (such as CD-ROMs) for timely response to learners' needs In language learning and communication skills development, the invention allows students to acquire, practice, and perfect skills at any time, in the privacy of their own home and at their own pace. It does away with the inefficiencies associated with traveling to a classroom and with conforming to specific class schedules. Further, it eliminates the discomfort and tension that some communication skills students experience, which greatly inhibits acquisition. It allows for material pronounced from audio or video clips to be customized to the student's own pace and requirements. The student can take advantage of the interactivity of Web-based learning in combination with traditional educational tools such as textbooks. For instance, the student can study from a textbook while viewing supplemental text and listening to sample material pronounced from any one of a choice of downloaded audio or video clips, which can be customized by the instructor or publisher to meet the students'/users/needs.

In addition, the student has complete control over the instructional medium as a function of his or her specific choices via interactive commands. Moreover, the student can learn from multiple audio streams or files originating from one or more Internet sites. Any one of a choice of downloaded audio streams or files may be selected using interactive commands issued by the student.

Further, interactive instructors and publishers can access a server and upload audio as well as other multimedia files, such as video clips along with suggested lessons, exercises, and activities. The instructor or publisher can sequence the audio clips using suitable authoring tools in combination with the system functions to create an interactive communication skills learning program tailored to his or her students' needs. In this manner, the process of acquiring foreign language and communication skills can be interactive and more individualized and thus, more enjoyable than other traditional ways of learning such material.

Further, the invention provides graphical displays that enhance acquisition of material by providing an additional channel of informational input. Added sensory stimulation provided by the visual representation of their oral performance can facilitate learning for students whose learning styles rely on visual more than aural modes.

Finally, book and other content publishers also benefit, as updates and revisions may be published on the web to reduce the need to print new editions, and these may be made interactive using the system. Moreover, web-based communication skills training can incorporate written materials such as textbooks and extends these materials with multimedia supplements to avoid obsolescence due to the ubiquity of the web as a publishing medium.

For performance arts learning, the invention makes instruction more cost effective and allows students an opportunity to learn and practice any instrument, musical piece, or role at his or her convenience in an interactive and possibly more motivating way. It also provides music teachers or drama coaches with the opportunity to supplement their teaching and monitor students' practice via the Internet.

In addition, the invention makes it much easier for many speech-language disorder clients, such as those dealing with stroke or other neurological problems for whom special transportation may require added expense and hardship, to gain access to the diagnosis and treatment they need.

Additionally, content providers may splice audio-visual advertisements into their content as it is delivered. By virtue of the demographic information that may be available to the content providers via the system, it may be possible to target specific student/users with specific commercials. This targeting, which is an extension of the controlled access to content described later in the document, may allow content to be delivered on a geographic basis and blackouts to be established based on business requirements.

DESCRIPTION

Figure 1:
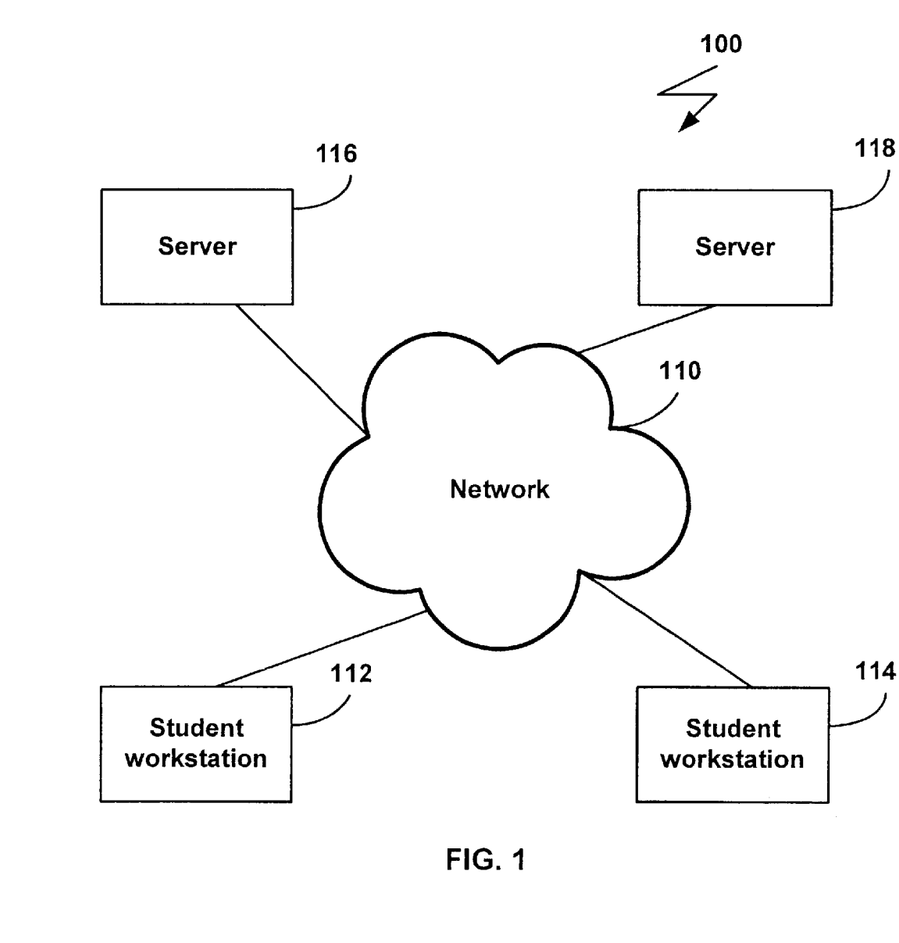
FIG. 1 is a schematic illustration of a networked system for teaching and assessing language, communication and performing arts skills, and for analyzing, diagnosing, and treating speech disorders.

Exemplary environments in which the techniques of the invention can be usefully employed are illustrated in FIG. 1. FIG. 1 shows a system 100 which includes one or more student/user workstations 112 and 114 connected to a network 110 such as the Internet. Also connected to the network 110 are one or more servers 116 and 118 which provide materials such as files relating to training, exercises or activities suitable for downloading to the student/user workstations 112 and 114.

In another embodiment, the student/user workstations 112 and 114 can be attached to a network such as a telephone network, which in turn is attached to an Internet Service Provider (ISP) proxy server. The ISP proxy server is connected to another network which provides connections to desired servers 116 and 118.

The student/user workstation 112 or 114 is a multimedia computer and contains a sound board which captures speech directed at a microphone. Speech is a product of the interaction of respiratory, laryngeal and vocal tract structures. The larynx functions as a valve that connects the respiratory system to the airway passages of the throat, mouth and nose. The vocal tract system consists of the various passages from the glottis to the lips. It involves the pharynx, and the oral and nasal cavities, including the tongue, teeth, velum, and lips. The production of speech sounds through these organs is known as articulation.

When the student/user speaks into the microphone, changes in pressure produced by the student/user's larynx and sensed by the microphone are converted to proportional variations in electrical voltage. In addition to the sounds produced by the larynx, sounds can be produced in other parts of the vocal tract. These sounds are usually made by forcing air to flow through narrow openings. For example, when an "s" sound is made, air is forced between the tongue and the roof of the mouth (the palate). The turbulence created with this air flow produces the desired sound. Vowels are typically in the low frequency, and consonants are in the high frequencies. The speech-related information is captured by the microphone as analog voltages.

The sound board converts analog voltage variations generated into digital sound waveforms using analog-to-digital conversion (ADC). Speech can be sampled at different rates, currently between 8000 kHz and 44.1 kHz. A higher the sampling rate yields better sound quality, but requires the transmission of greater amounts of data, and thus, larger sound files. Also, each sampled pressure value is rounded or quantized to the nearest value. The quantization level can be 8–32 bits, with 16-bits being typical.

The student/user workstation 112 or 114 also includes a network browser such as Web browser software for viewing a web page. In addition to text and images positioned on the web page, the web page is enhanced by various executable programs (currently and commonly referred to as "applets" or "applet-type programs") attached to it. These programs may be downloaded and executed by the web browser along with the text, graphics, sound and video associated with the web page.

These executable programs are constructed from a particular type of programming language, one of which is the Java language, available from Sun Microsystems, Inc. of Mountain View, Calif. Java is executed by the web browser to enhance the web page with additional functionality and represents the current state of the art of this attached executable file technology as it pertains to the invention, though the functions and processes described may in future be implemented by other programming languages.

In particular, one implementation of Java called Java Sound provides uniform access to underlying platform sound capabilities. Java Sound is part of the Java Media family, which addresses the increasing demand for multimedia by providing a unified, non-proprietary, platform-neutral solution for incorporating time-based media, 2D fonts, graphics, and images, speech input and output, 3D models, and telephony in Java programs. By providing standard players and integrating these supporting technologies, the Java Media Application Program Interfaces (APIs) enable developers to produce and distribute media-rich content such as educational content.

Java Sound presently enables Java programs to read and write sampled and synthesized audio data high-level services such as compression, decompression, synchronization, streaming, container read/write, and network transport through the Java Media Framework (JMF). JMF provides a simple, unified way for Java Programs to synchronize and display time-based data such as audio and video.

Java Sound provides a very high-quality 64-channel audio rendering and MIDI sound synthesis engine that enables consistent, reliable, high-quality audio on all Java platforms; minimizes the impact of audio-rich web pages on computing resources; reduces the need for high-cost sound cards by providing a software-only solution that requires only a digital-to-analog converter (DAC). Java Sound supports a wide range of audio formats so that audio clips can record and play from both applet-type programs and applications. The clips can be any of the following audio file formats: AIFF, AU, WAV, MIDI (Type 0 and Type 1 files) and RMF, among others.

Figure 2:
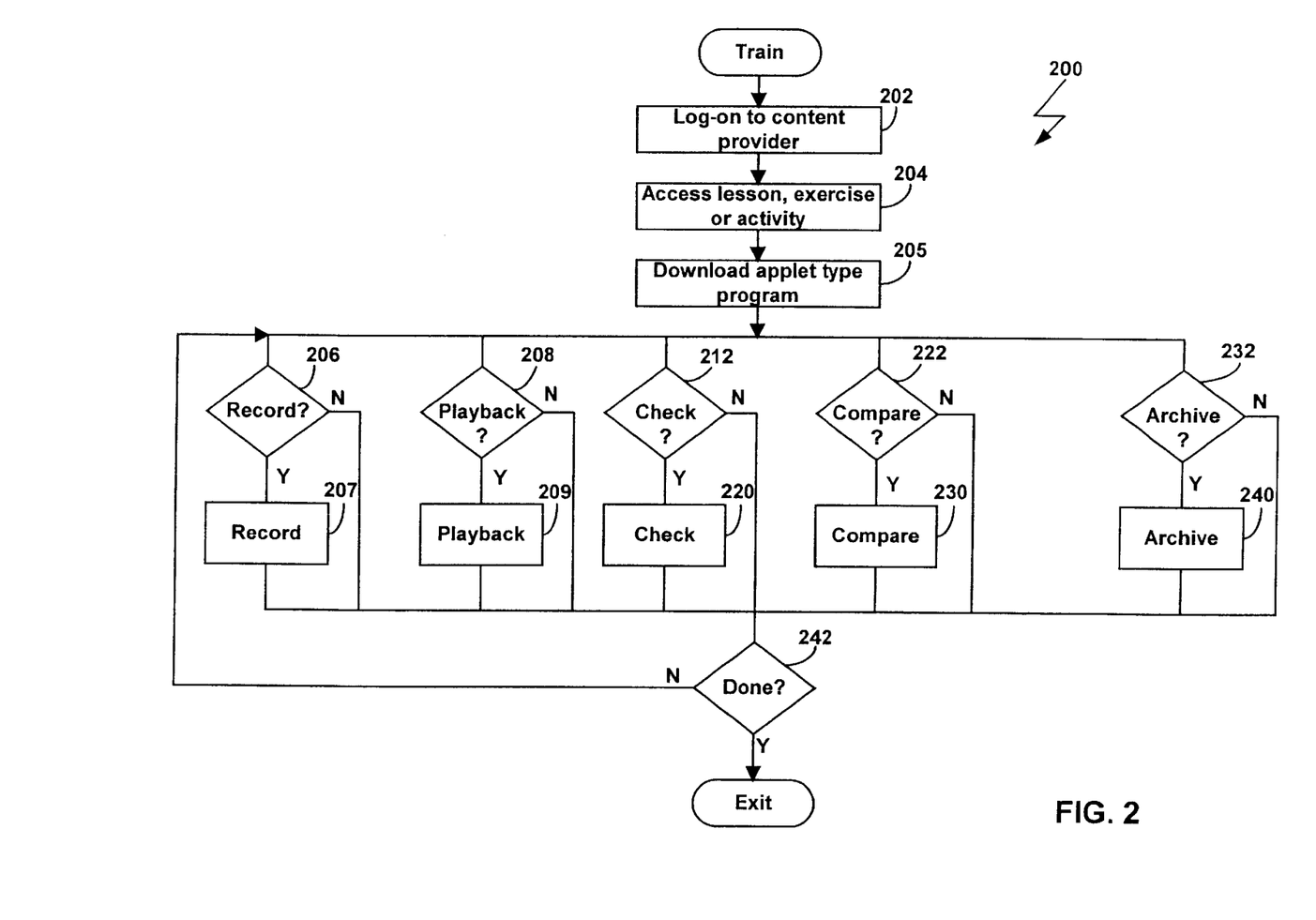
FIG. 2 is a flowchart illustrating all the possible combinations of processes for training a student/user.

Referring now to FIG. 2, process 200, an overview of all possible training processes of the invention is shown. First, a student/user, such as a student, logs-on to one of servers 116 and 118 (FIG. 1) operated by one or more content providers (step 202). The log-on process can be controlled by a subscription control model where the student/user pays a one-time course fee or a periodic fee (for example monthly) for access to the service. Additionally, the system supports a pay-per-view control model where the student/user pays each time he or she accesses a stream on content. In the subscription model the system ensures that only valid customers gain access. Once the subscription has been established, access to subscription services is transparent to the student/user, unless the subscription expires. In the pay-per-view model, the student/user gains access to the content through a secure web page. The student/user may enter credit card information or provide payment in some other way. Only when the payment has been validated is the student/user's player allowed to access the content stream.

After gaining entry to the content provider's server, the student/user accesses one or more multimedia content files, including lessons, exercises or planned activities provided by the content provider (step 204). Next, the invention applet-type program herein described is either downloaded from the same content provider (for example, an educational publisher), or from some other source such as a separate educational portal site or server (step 205). The applet-type program is a small downloadable software program such as software written in Java, or another language.

When executed, the applet-type program displays a plurality of student/user interface icons to the student/user such as one or more buttons in a floating panel, frame or diagram. In the embodiment of FIG. 2, a plurality of buttons are displayed by the applet-type program on the computer's screen to facilitate the training process. Depending on the number of functions to be provided by the content provider or server site operator, one or more of the following buttons can be shown: a record button, a playback button; a check button; a compare button; and an archive button. Additionally, an exit button is provided to allow the student/user to close the panel, frame or diagram and to end the application. Each button may be activated singly or in combination with others. The following steps are detailed with respect to these buttons.

In step 206, the process 200 checks whether the record button has been selected. If so, a record module is executed (step 207). Preferably, the recording operation should precede any other operation such as playback, check, compare or archive operation. Step 207 is shown in more detail in FIG. 3. From step 206, if the record button has not been selected, the process 200 checks whether the play button has been selected (step 208). If so, data previously captured from the student/user is played by the computer (step 209). From step 207 or 209, the process 200 checks whether the student/user has completed the session (step 242). If the student/user wishes to continue the training process, he or she clicks the button corresponding to the desired component process. If the student/user doesn't wish to continue, he or she clicks the exit button.

The process 200 also determines whether the check button has been selected (step 212). If so, the process 200 executes a check module (step 220) before proceeding to step 242 to continue the training session. Step 220 is shown in more detail in FIG. 4.

The process 200 further checks whether the compare button has been selected (step 222). If so, a compare module is executed (step 230). Step 230 is shown in more detail in FIG. 5.

Figure 6:
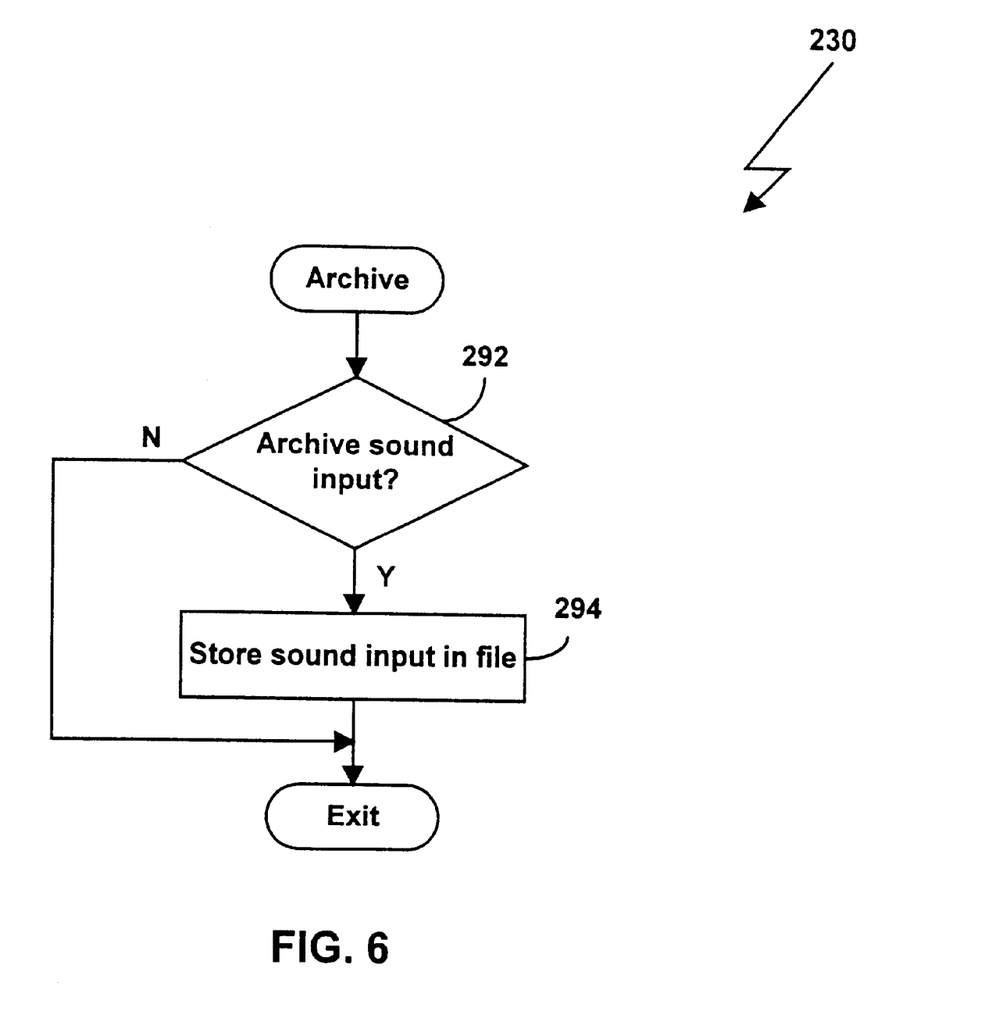
FIG. 6 is a flowchart illustrating a process for archiving the student/user's sound input.

The process 200 also checks whether the archive button has been selected (step 232). If so, an archive module, shown in more detail in FIG. 6, is executed (step 240).

As shown in FIG. 2 and discussed above, each button associated with the record, playback, check, compare and archive operations can be used singly or in combination with one or more operations. These buttons can be executed in any order, depending upon what the student/user wants to do.

Upon completing the execution of each of the modules, the process 200 loops back to step 242 to check whether the student/user desires to end the training process. If so, the process 200 ends. However, following the process from beginning to end and executing all the components will afford the student/user an optimal learning experience.

Figure 3A:
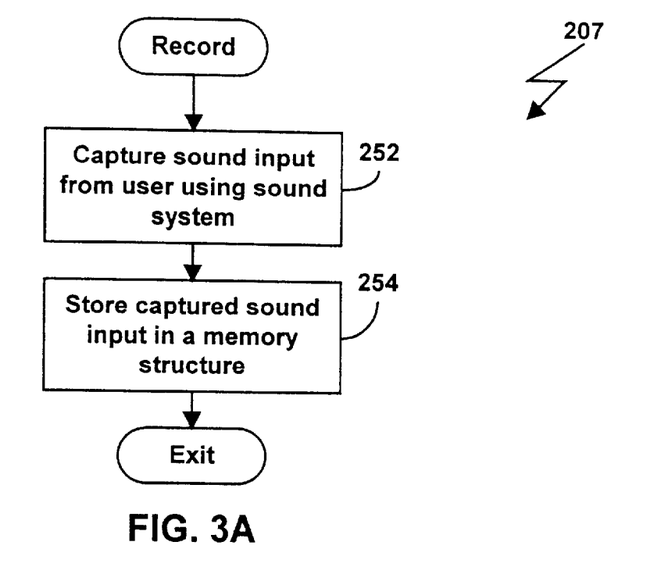
FIG. 3A is a flowchart illustrating a process for recording the student/user's sound input.
Figure 3B:
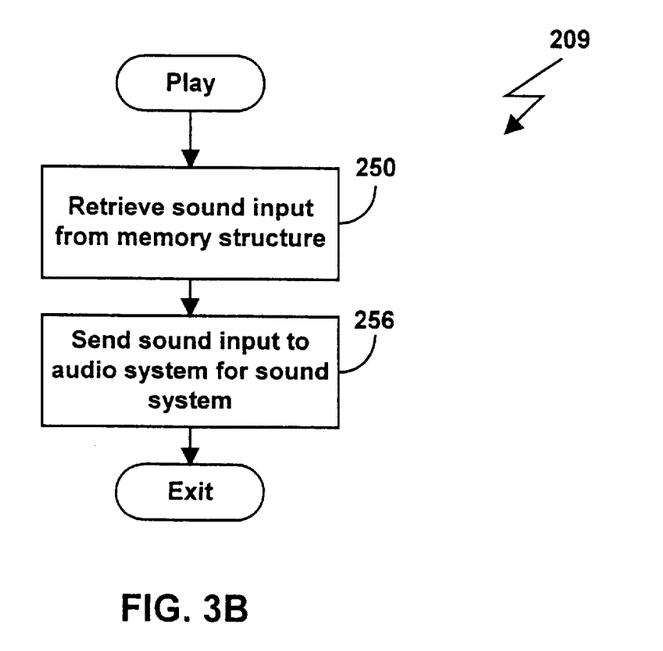
FIG. 3B is a flowchart illustrating a process for playing the student/user's sound input.

Referring now to FIGS. 3A and 3B, the record and playback component processes 207 and 209 of FIG. 2 are shown in more detail. In FIG. 3A, the record process 207 is detailed. First, sound input from the student/user is captured by the sound system (step 252). The captured sound input is stored in a data storage structure for subsequent playback or editing as necessary (step 254). The captured sound input may be compressed or uncompressed. The sound input can be stored in memory or in a data storage device such as flash memory or a disk drive.

FIG. 3B shows the playback process 209 in detail. In the process 209, the sound input of the student/user is retrieved from the memory or data storage device (step 250). Next, the sound input can be streamed to the audio system and played for the student/user to provide a multimedia example to imitate and learn from (step 256) or to allow the user to listen to his or her own sound input for analysis.

Through the record/playback functions, the student/user can imitate a sound model and, upon reaching what he or she considers a satisfactory emulation as compared to the sample source sound, can capture his or her sound input to a data structure in memory for temporary storage.

In one embodiment, the student/user clicks on the record button to stop the recording of his or her sound input. In a second embodiment, a stop button is provided for the student/user to select when he or she is finished with the sound input. Alternatively, an automated end-point detection process may be used to stop the recording process. The end-point detection process identifies sections in an incoming audio signal that contain speech. In one embodiment, the detection process detects as an end-point when the sound input is silent (no other noises). Typical algorithms look at the energy or amplitude of the incoming signal and at the rate of "zero-crossings". A zero-crossing occurs when the audio signal changes from positive to negative or visa versa. When the energy and zero-crossings are at certain levels, the end-point detection process determines that the student/user has started talking and thus captures the sound input into the data storage structure for storage. Once captured, the student/user's sound may be generated by playing sound data stored in the data storage structure.

The student/user can play his or her captured sound and, based on the reproduced sound, determine for himself or herself whether the produced sound is satisfactory (step 254). If so, the process 210 exits. If not, the student/user can decide whether the sample file is to be played again to refresh himself or herself of the model sound (step 256). If so, the process loops back to step 250 where the student/user can play the downloaded sample multimedia file. Alternatively, the process 210 loops back to step 252 to allow the student/user to mimic the word/phrase and capture the sound input.

The student/user can click the playback button to play his or her captured sound. At this point, the student/user has various options. One option is for the student/user to exit process 210. Another option is for the student/user to decide whether the sample file is to be played again to refresh himself or herself of the model sound (step 256). If so, the process loops back to step 250 where the student/user can play the downloaded sample multimedia file. Alternatively, the process 210 loops back to step 252 to allow the student/user to imitate the word/phrase and capture the sound input as many times as desired.

Figure 4:
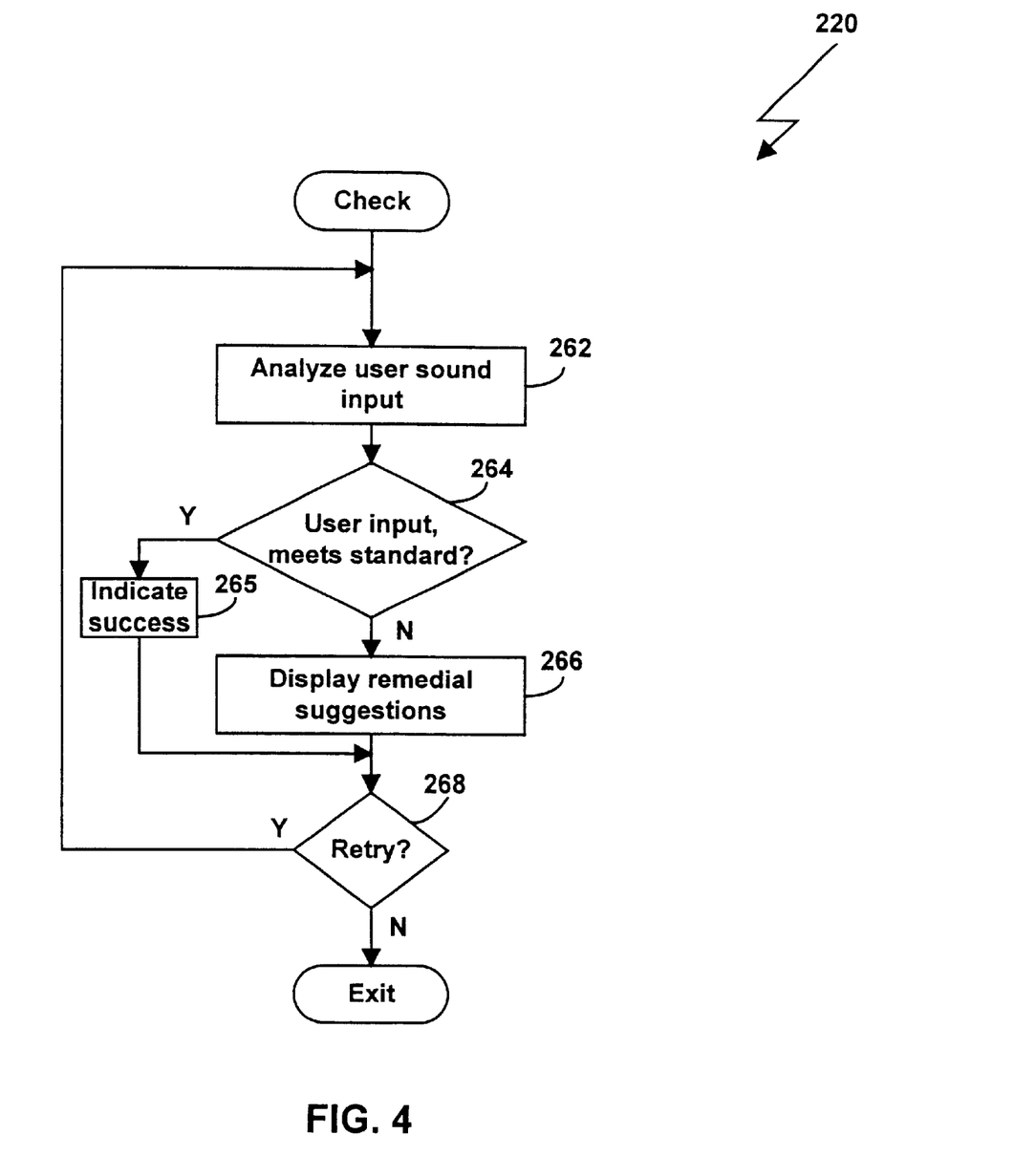
FIG. 4 is a flowchart illustrating a process for checking the student/user's sound input.

Turning now to FIG. 4, the process 220 of FIG. 2 is illustrated in more detail. The process 220 allows the computer to automatically check whether the student/user's sound input meets a predetermined sound input standard. The process 220 then analyzes the student/user sound input (step 262).

From step 262, the process 220 determines whether the sound input is acceptable relative to a predetermined standard (step 264). In one embodiment, confidence-level assessment technology may be used to do this. If the sound input is acceptable, a green light is displayed (step 265). If not, the process 220 then displays a failure indication, such as a red light, and/or various remedial suggestions to the student/user (step 266). From step 264 or step 266, the process 220 further checks whether the student/user wishes to retry the training process. If so, the process 220 loops back from step 268 to step 260 to continue the checking process. Otherwise, the process 220 exits.

The process of FIG. 4 can, for example, allow the user to check whether consonants are properly formed and performed with sufficient intensity so the diction is made clear. Moreover, vowel issues such as purity, shifts, diphthong, transitions initiations, staccato, endings and transitions can be identified and resolved. In the same way, it can also compare the stress and intonation of a communication trainee or drama student's utterance with that of a model, or the timbre of the sound of the user's vibrating violin string with that of a model.

Figure 5:
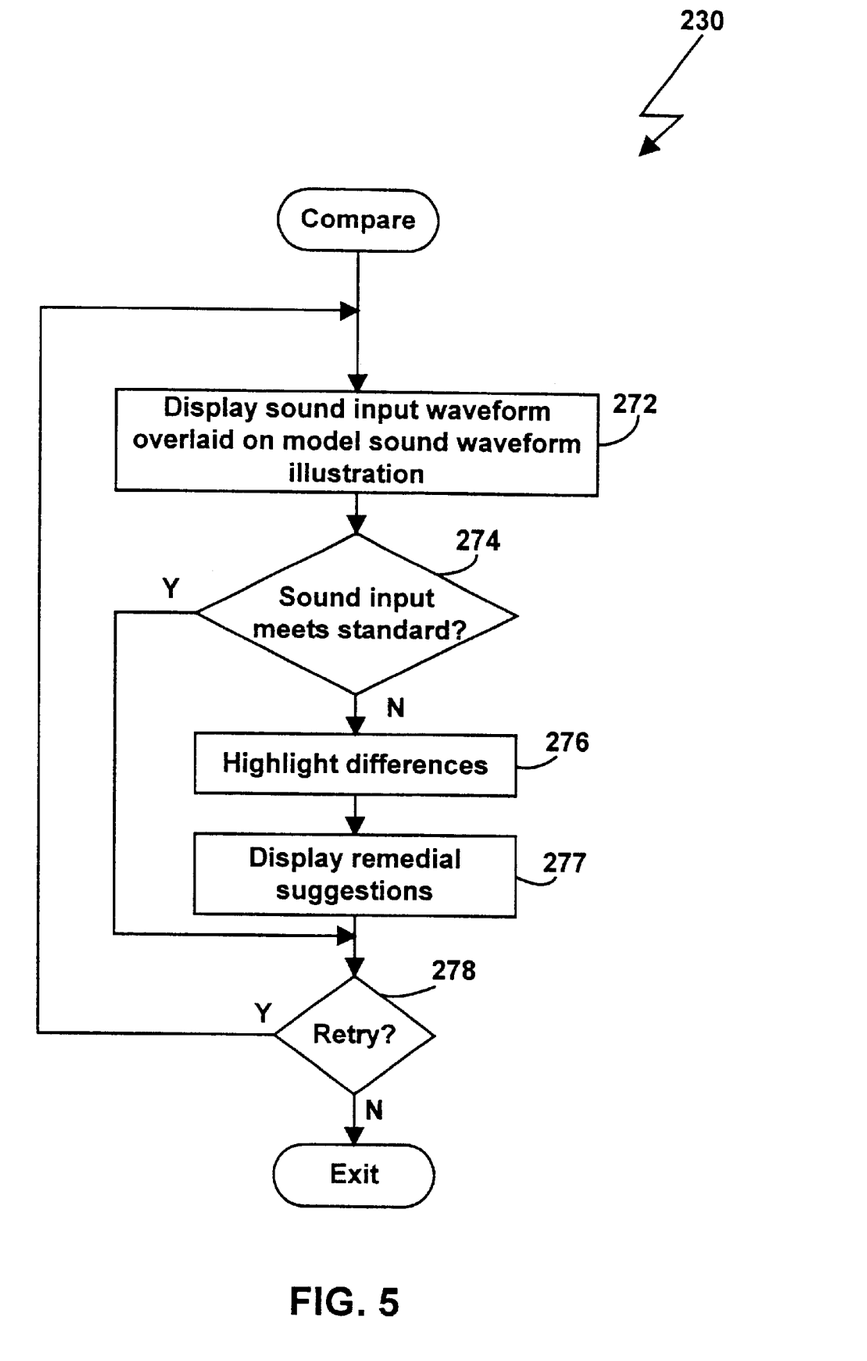
FIG. 5 is a flowchart illustrating a process for visually comparing the student/user's sound input against a model sound.

Turning now to FIG. 5, the compare module 230 of FIG. 2 is shown in more detail. First, the process 230 creates a waveform for the model sound file, then a waveform for the student/user's input sound file. Then it overlays the latter on the former so the student/user can compare them (step 272).

By overlaying the student/user's speech (or sound) waveform, over the model sound input waveform, the compare module 230 provides the student/user with visual feedback regarding his or her sound input relative to a "norm" or a standard sound input. The student/user can interactively repeat his or her sound input until it satisfactorily approximates the model sound input.

Alternatively or additionally, the waveforms may be simplified as graphical representations so that the graphics need not follow exactly the student/user's sound waveform. Thus, speech information may be extrapolated and simplified representations can be delivered as feedback for the student/user.

Additionally, the process 230 can analyze model and student/user sound files and display spectrograms to allow student/users to visually compare his or her sound input with the model sound input. In the spectrogram embodiment, time is plotted along the horizontal axis, and frequency is plotted along the vertical axis. The intensity of the sound at each particular time is represented by the amount of shading in the graph.

As discussed above, the student/user can manually review the displays of the sound input waveforms or spectrograms and repeat the sound input process if necessary. Alternatively, the process 230 can determine whether the sound input meets a predetermined standard (step 274). In one embodiment, this is done by computing waveform differences or spectrogram differences between the student/user's sound input and the model sound input, and if the differences exceed a predetermined tolerance range, the process brings up a graph that indicates the deviation to the student/user who then can refine his or her sound input.

Thus, if the deviation is significant, the process 230 highlights the differences (step 276) and in effect, prompts the student/user to decide as to whether or not he or she wishes to retry the training process (step 278). From step 278, in the event that the student/user does not wish to retry the lesson or exercise, the process 230 exits.

The analysis in step 274 can also be done using a number of audio or speech processing functions which essentially analyze a complex signal such as the voice as being made up of the sum of sound waves of many different frequencies. The vibration of the vocal folds produces a series of harmonics. The lowest harmonic is called the fundamental frequency, and it is typically about 100 Hertz.

In one embodiment, the analysis uses spectrum analysis. In this case, speech sounds, especially vowels, have distinctive signatures (patterns of bands at certain frequencies). Vowels, for example, are identifiable by two or three bands of energy (called "formants") at certain intervals, or in the case of diphthongs, movement of the bands over time. These signatures may be revealed using a sound spectrogram, which is a plot of the amount of energy at various frequencies over time.

The student/user's sound can be represented as a combination of sine waves of various frequencies. Fourier analysis is applied to the speech waveform to discover the presence of frequencies at any given moment in the speech signal. The Fourier transform can analyze a signal in the time domain for its frequency content. The transform works by first translating a function in the time domain into a function in the frequency domain. The signal can then be analyzed for its frequency content because the Fourier coefficients of the transformed function represent the contribution of each sine and cosine function at each frequency.

The result of Fourier analysis is a spectrum, or the intensities of various sine waves that are the components of that sound. After computing the spectrum for one short section or window (typically 5 to 20 milliseconds) of speech, the spectrum for the adjoining window is then computed until the end of the waveform is reached.

The spectra computed by the Fourier transform are displayed parallel to the vertical or y-axis. For a given spectrogram, the strength of a given frequency component at a given time in the speech signal is represented by the darkness or color of the corresponding point of the spectrogram. In one embodiment, the resulting spectrogram may be displayed in a gray-scale rendition, where the darkness of a given point is proportional to the energy at that time and frequency. However, color may be used as well. In this embodiment, the waveform and spectrogram for the same segment of speech may be shown one on top of the other so that it is easy to see the relation between patterns in the waveform and the corresponding patterns in the spectrogram.

In this manner, the process of FIG. 5 allows the student/user to check whether consonants are properly formed and performed with sufficient intensity so the diction is made clear. Moreover, vowel issues such as purity, shifts, dipthong, transitions, initiations, staccato, endings and transitions can be identified and resolved. In the same way, it can also compare the stress and intonation of a communication trainee or drama student's utterance with that of a model, or the timbre of the sound of the user's vibrating violin string with that of a model.

Although spectrogram analysis is used, other analytical methods may be used as well. For instance, linear prediction analysis of speech may be used. The basis is a source-filter model where the filter is constrained to be an all-pole linear filter. This amounts to performing a linear prediction of the next sample as a weighted sum of past samples. In other embodiments, formant analysis may be used. Formants are perceptually defined, and the corresponding physical property is the frequencies of resonances of the vocal tract. Additionally, non-linear frequency scales that approximate the sensitivity of the human ear may be used, including Constant Q where Q is the ratio of filter bandwidth over center frequency, hence this implies a exponential form; Equivalent Rectangular bandwidth (ERB), where the bandwidths of the auditory filters are measured; Bark, which is derived from perception experiments; Basilar membrane, which is the distance measured along the basilar membrane; and Mel, an engineered solution to non-linear frequency scales.

Additionally, neural networks can be used to perform the analysis. A neural network consists of a collection of cells which are interconnected, where every connection has an associated positive or negative number, called a weight or component value. Each cell employs a common rule to compute a unique output, which is then passed along connections to other cells. The particular connections and component values determine the behavior of the network. Through a training process, the component values are set. During operation, data is "weighted" using the component values, and the outputs of the cells are cumulated from one layer of cells to the next layer of layers until the outputs propagate to the output cell.

Referring now to FIG. 6, the archive module 240 of FIG. 2 is illustrated. The process 240 prompts the student/user as to whether or not the sound input is to be archived (step 292). If so, the student/user's sound input file can be compressed before it is uploaded to a remote server (step 294). The file transfer can use a number of suitable transfer protocols such as the Internet file transfer protocol (FTP), among others. From step 292 or 294, upon receiving an acknowledgment of a successful file transfer, the process of FIG. 6 exits.

Figure 7:
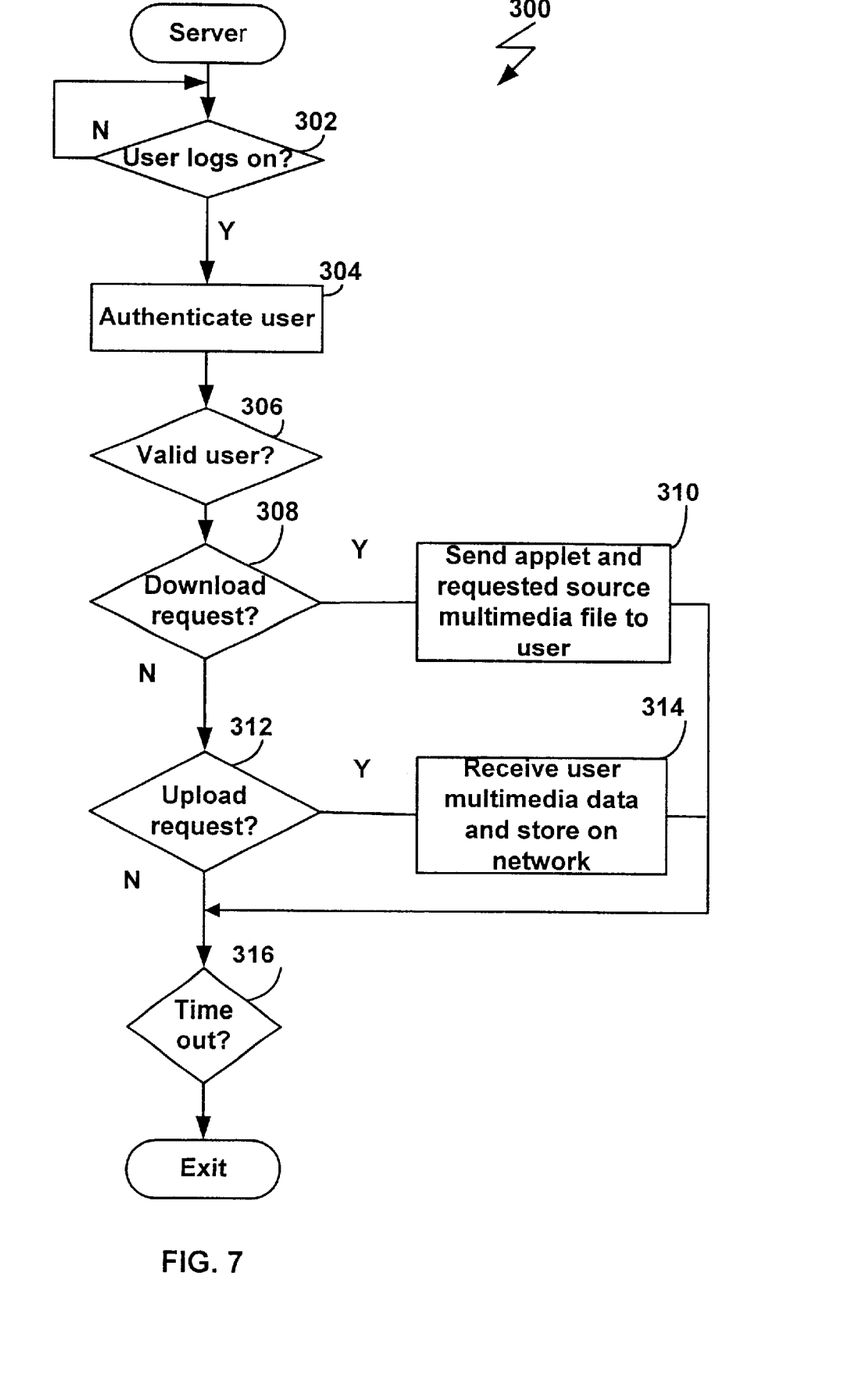
FIG. 7 is a flowchart illustrating a process for handling student/user requests at a server.

Turning now to FIG. 7, a server process 300 is shown. The server process 300 handles requests and commands from the student/user workstation 112 or 114. First, the process 300 checks whether the student/user is logged in (step 302). If so, the process 300 authenticates the student/user (step 304). From step 306, if the student/user is authorized, the process 300 accepts commands and requests from the student/user workstation 112 or 114. First, the process 300 checks whether the request is a download request (step 308). If so, the server process 300 sends the invention (in the form of a floating-type panel of buttons that delivers a variety of component functions) along with a requested source multimedia file to the student/user workstation 112 or 114 if the server is supplying both (step 310); if not, the multimedia source file may come from another server.

From step 308, in the event that the request is not a download request, the server process 300 checks whether the request is an upload request (step 312). If so, the process 300 receives the student/user multimedia data file and stores it on the network to be retrieved and reviewed later by the student/user, an instructor, or another person (step 314). Additionally, data associated with the student/user can be provided to an educational institution for subsequent review by an educator.

From step 312, in the event that the request is neither a download or an upload request, the server process 300 checks whether the student/user connection has timed out (step 316). If not, the process 300 loops back to step 308 to continue processing student/user requests.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. These programmable computers include workstations, desktop computers, handheld computers and computer appliances. Program code is applied to data entered using an input device to perform the functions described and to generate output information. The output information is applied to one or more output devices.

Figure 8:
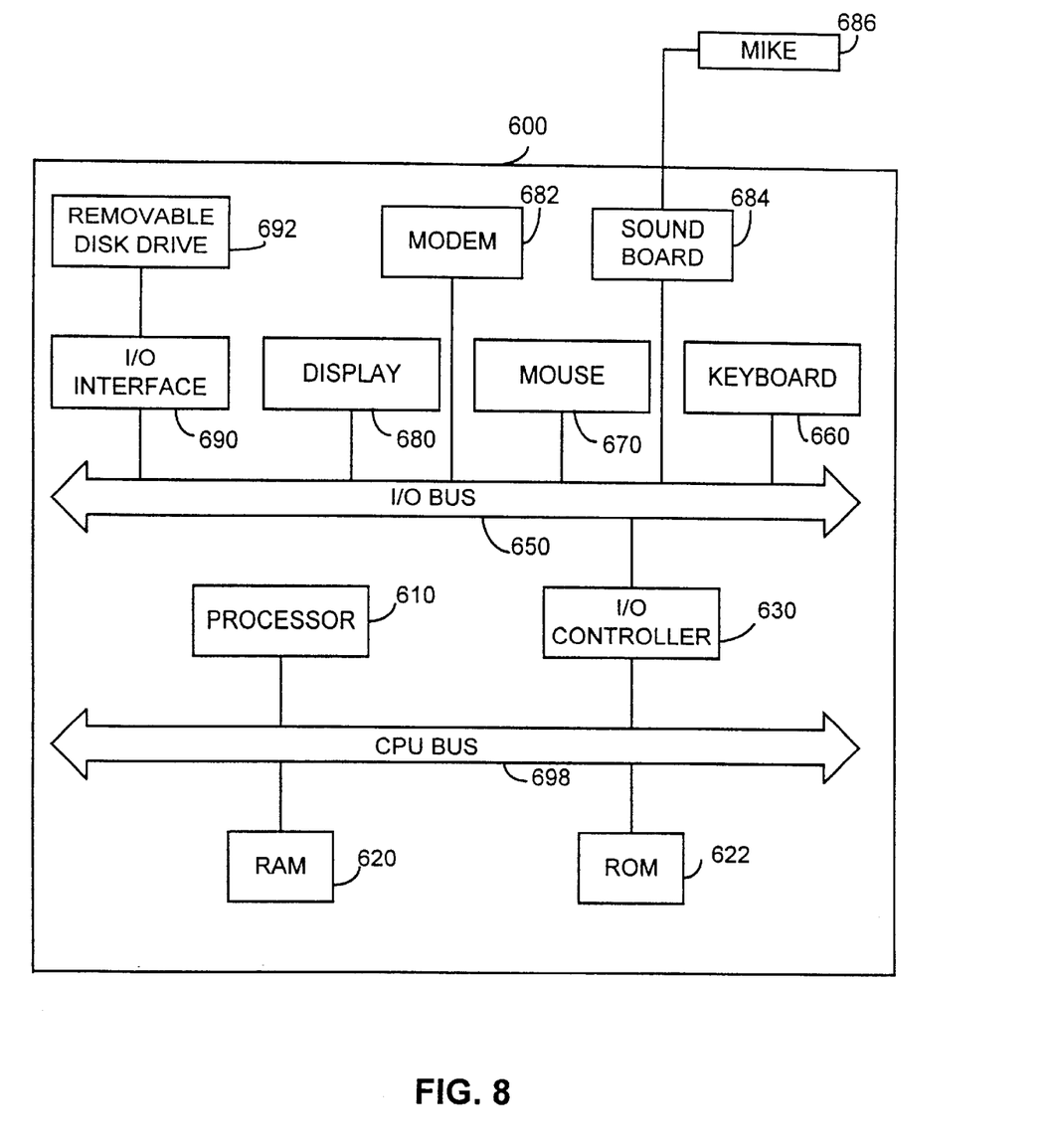
FIG. 8 is a schematic diagram of an exemplary student/user workstation.

FIG. 8 illustrates one such computer system 600, including a CPU 610, a RAM 620, a ROM 622 and an I/O controller 630 coupled by a CPU bus 698. The I/O controller 630 is also coupled by an I/O bus 650 to input devices such as a keyboard 660 and a mouse 670, and output devices such as a monitor 680. A modem 682 is attached to the I/O bus 650 to allow the student/user to connect to the Internet and to communicate with other networks.

Additionally, a sound board 684, such as a SoundBlaster sound board, is connected to the I/O bus 650. A microphone 686 is connected to the input of the sound board 684 to capture the student/user's voice or instrument. The microphone is an acoustic to electronic transducer. Its internal diaphragm sympathetically moves from the compression and rarefaction of sound wave energy that reaches it. This movement of the diaphragm is converted to an electronic signal. A conventional microphone or a noise canceling microphone, which measures the pressure difference in a sound wave between two points in space, may be used. Noise canceling microphones are advantageous in noisy environments since they pick up desired sounds that are close to the student/user while rejecting unwanted noise that is farther away.

The I/O controller 630 also drives an I/O interface 690 which in turn controls a removable media drive 692. Typically, memory media such as a floppy disk, CD ROM, or Digital Video Disk can contain the program information for controlling the computer to enable the computer to performs its functions in accordance with the invention.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Additionally, although embodiments of the invention are described as sound-based training systems, video-based training can also be done. In these embodiments, the student/user workstation captures video information from the student or user and communicates this information across a network. Multipoint conferencing can also be provided over circuit-switched communication networks. Moreover, other multimedia systems which support long distance communication of coordinated voice, video and data can also be used in conjunction with the invention.

While the invention has been shown and described with reference to an embodiment thereof, those skilled in the art will understand that the above and other changes in form and detail may be made without departing from the spirit and scope of the following claims.

What is claimed is:

1. A method for training at a local computer coupled to a network, comprising:
   downloading an applet-type program for capturing sound data from a user;
   capturing sound data from the user;
   providing feedback to the user by allowing the user to play and capture sound data; and
   archiving the captured sound data over the network.

2. The method of claim 1, further comprising comparing the captured sound data against the one or more sound source files.

3. The method of claim 2, further comprising displaying waveforms associated with the captured sound data to the user for review.

4. The method of claim 2, further comprising displaying spectrograms associated with the captured sound data to the user for review.

5. The method of claim 2, further comprising displaying a spectrogram associated with the captured sound data over a spectrogram associated with one or more sound source files.

6. The method of claim 2, wherein the sound data is speech or audio data.

7. The method of claim 1, wherein the applet-type program is a Java Sound applet.

8. The method of claim 1, further comprising storing the captured sound data in a data storage structure.

9. The method of claim 1, further comprising uploading the captured sound data to a remote server.

10. A network training system, comprising:
    means for downloading an applet-type program for capturing sound data from a user;
    means for capturing sound data from the user;
    means for providing feedback to the user by allowing the user to play and capture sound data; and
    means for archiving the captured sound data over the network.

11. The system according to claim 10, wherein the applet-type program allows a user to capture one or more sound source files.

12. The method of claim 11, further comprising means for comparing the captured sound data against the one or more sound source files.

13. The method of claim 11, further comprising means for displaying waveforms associated with the captured sound data to the user for review.

14. The method of claim 11, further comprising means for displaying spectrograms associated with the captured sound data to the user for review.

15. An educational workstation, comprising:
    a processor;
    a display device coupled to the processor;
    a network interface device coupled to the processor to allow the processor to communicate with the server over a network;
    a sound system coupled to the processor;
    a data storage device coupled to the processor, the data storage device adapted to store instructions to:
      download an applet-type program for capturing sound data from a user;
      capture sound data from the user;
      provide feedback to the user by allowing the user to play and capture sound data; and
      archive the captured sound data on a server over the network.

16. A remote training system, comprising:
    a server adapted to download instructional materials over a network and to archive captured sound data over the network; and
    a workstation adapted to communicate with the server, the workstation including:
      means for downloading an applet-type program for capturing sound data from a user;
      means for capturing sound data from the user;
      means for providing feedback to the user by allowing the user to play and capture sound data; and
      means for archiving the captured sound data on a server over the network.

17. The method of claim 16, wherein the server sends materials from a publisher.

18. The method of claim 16, wherein the server sends materials from a content provider.

* * * * *